(12) United States Patent
Iwane

(10) Patent No.: US 7,973,928 B2
(45) Date of Patent: Jul. 5, 2011

(54) SPECTROSCOPIC INSTRUMENT, IMAGE PRODUCING DEVICE, SPECTROSCOPIC METHOD, AND IMAGE PRODUCING METHOD

(75) Inventor: Toru Iwane, Yokohama (JP)

(73) Assignee: Nikon Corporation, Tokyo (JP)

( * ) Notice: Subject to any disclaimer, the term of this patent is extended or adjusted under 35 U.S.C. 154(b) by 549 days.

(21) Appl. No.: 12/078,697

(22) Filed: Apr. 3, 2008

(65) Prior Publication Data

US 2008/0291445 A1 Nov. 27, 2008

(30) Foreign Application Priority Data

Apr. 6, 2007 (JP) ................................. 2007-100499

(51) Int. Cl.
*G01J 3/28* (2006.01)
(52) U.S. Cl. ....................................................... 356/328
(58) Field of Classification Search .................. 356/326, 356/328–330
See application file for complete search history.

(56) References Cited

U.S. PATENT DOCUMENTS

2006/0072109 A1 * 4/2006 Bodkin et al. ................. 356/328

FOREIGN PATENT DOCUMENTS

JP A 2003-309747 10/2003

* cited by examiner

*Primary Examiner* — Tarifur Chowdhury
*Assistant Examiner* — Tara S Pajoohi
(74) *Attorney, Agent, or Firm* — Oliff & Berridge, PLC

(57) ABSTRACT

The spectroscopic instrument includes a plurality of first lenses arranged one-dimensionally or two-dimensionally; an aperture opening provided near a focal plane of each of the plurality of first lenses; a spectroscopic unit that spectrally distribute the light that has passed through the aperture opening; and a light receiving unit that receives the light spectrally distributed by the spectroscopic unit. The image producing device includes: the spectroscopic instrument; an imaging unit that captures an image formed by an imaging optical system; and an image processing unit that acquires a lighting condition from a result of spectroscopy by the spectroscopic instrument and performs color conversion processing depending on the lighting condition on an image captured by the imaging unit.

19 Claims, 11 Drawing Sheets

SPECTROSCOPIC INSTRUMENT, IMAGE PRODUCING DEVICE, SPECTROSCOPIC METHOD, AND IMAGE PRODUCING METHOD

INCORPORATION BY REFERENCE

The disclosure of the following priority application is herein incorporated by reference:

Japanese Patent Application No. 2007-100499 filed Apr. 6, 2007.

BACKGROUND OF THE INVENTION

1. Field of the Invention

The present invention relates to a spectroscopic instrument and an image producing device equipped with the spectroscopic instrument. Also, the present invention relates to a spectroscopic method and an image producing method utilizing the spectroscopic method.

2. Description of Related Art

In electronic imaging devices such as digital still cameras and the video cameras, light and the lighting of surroundings should be examined closely and some color processings should be done to the image so that more accurate color reproduction is achieved. Among such electronic imaging devices, there is known an electronic imaging device that acquires a multi-spectral image in order to reproduce color information that conventional RGB color images could not express satisfactorily (for instance, see Japanese Laid-open Patent Application No. 2003-309747). This conventional device has a construction such that the spectral image is generated based on a captured image by a light flux from a direction of a subject.

One or more types of illumination sources are used as the case may be to irradiate light to the subject. When light from a plurality of light sources located in various directions is used, it is necessary to know the direction in which light enters and the spectrum characteristics thereof, and judge what these individual light sources are like in order to specify those illumination light sources.

SUMMARY OF THE INVENTION

According to a first aspect, the present invention provides a spectroscopic instrument, including: a plurality of first lenses arranged one-dimensionally or two-dimensionally; an aperture opening provided near a focal plane of each of the plurality of first lenses; a spectroscopic unit that spectrally distributes a light flux that has passed through the aperture opening; and a light receiving unit that receives the light spectrally distributed by the spectroscopic unit.

According to a second aspect, in the spectroscopic instrument according to the first aspect, the aperture opening may be disposed at a position deviated from an optical axis of the first lens corresponding to the aperture opening in a direction toward the focal plane.

According to a third aspect, in the spectroscopic instrument according to the second aspect, an amount of deviation or a direction of deviation of the position at which the aperture opening is disposed from the optical axis may be different for each of the plurality of aperture openings.

According to a fourth aspect, in the spectroscopic instrument according to the first aspect, the light receiving unit may include a plurality of light receiving elements, and the spectroscopic unit may input the light that has passed through the aperture opening into different light receiving elements out of the plurality of the light receiving elements depending on wavelength thereof.

According to a fifth aspect, in the spectroscopic instrument according to the first aspect, the light receiving unit may include a plurality of light receiving elements, and the spectroscopic unit may include a second lens disposed for each of the aperture opening to collimate the light that has passed through the aperture opening; and a diffracting optical element that diffracts the light from the second lens depending on wavelength thereof and input the diffracted light into different light receiving elements out of the plurality of the light receiving elements depending on the wavelength thereof.

According to a sixth aspect, the spectroscopic instrument according to the fifth aspect may further include: a light shielding unit that prevents a zeroth (0th) diffracted light out of the diffracted light diffracted by the spectroscopic unit from entering the light receiving unit.

According to a seventh aspect, in the spectroscopic instrument according to the first aspect, the light receiving unit may include a plurality of light receiving elements, and the spectroscopic unit may include a second lens disposed for each of the aperture opening to collimate the light that has passed through the aperture opening; and a spectral prism that spectrally distributes the light from the second lens depending on wavelength thereof and input the spectrally distributed light into different light receiving elements out of the plurality of light receiving elements depending on the wavelength thereof.

According to an eighth aspect, the spectroscopic instrument according to the fourth aspect may further include: a member that is disposed between the spectroscopic unit and the light receiving unit to keep the spectroscopic unit and the light receiving unit at a predetermined distance and prevent unnecessary light from entering into the light receiving elements.

According to a ninth aspect, the present invention provides an image producing device including: a spectroscopic instrument according to the first aspect; an imaging unit that captures an image formed by an imaging optical system; and an image processing unit that acquires a lighting condition from a result of spectroscopy by the spectroscopic instrument and performs color conversion processing depending on the lighting condition on an image captured by the imaging unit.

According to a tenth aspect, the present invention provides a spectroscopic method including: restricting light incident through a plurality of first lenses arranged in a one-dimensional or two-dimensional array via an aperture opening arranged in the vicinity of a focal plane of each of the plurality of first lenses; and spectrally distributing the light that has passed through the aperture opening.

According to an eleventh aspect, the present invention provides an image producing method, including: capturing an image formed in an image formation system; spectrally distributing light by restricting the light incident through a plurality of first lenses arranged in a one-dimensional or two-dimensional array via an aperture opening arranged in the vicinity of a focal plane of each of the plurality of first lenses, spectrally distributing the light that has passed through the aperture opening; obtaining a lighting condition from a result of the spectral distributing of light and performing color conversion processing depending on the lighting condition on the captured image.

According to this invention, lights from a plurality of directions can be spectroscopically measured separately and simultaneously.

DETAILED DESCRIPTION OF PREFERRED EMBODIMENTS

Figure 1:
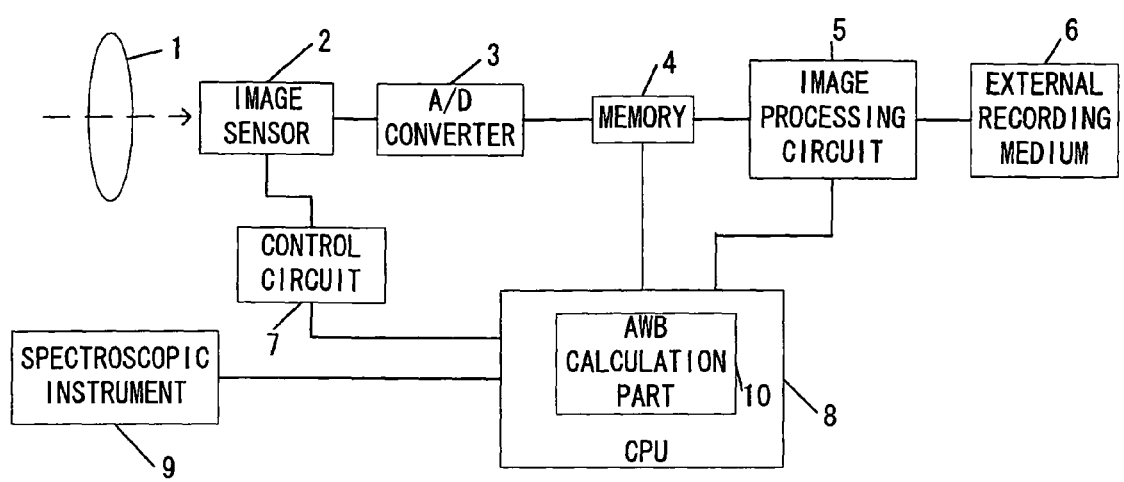
FIG. 1 is a block diagram of a digital camera equipped with a spectroscopic instrument in accordance with the present invention.

The following is an explanation of an embodiment of the present invention given in reference to the attached drawings. FIG. 1 is a block diagram of a digital camera equipped with a spectroscopic instrument in accordance with the present invention. The digital camera shown in FIG. 1 includes a photographic lens 1, an image sensor 2, an analog to digital (A/D) converter 3, a memory 4, an image processing circuit 5, an external recording medium 6, a control circuit 7, a CPU 8, and a spectroscopic instrument 9. The CPU 8 includes an AWB calculation part 10. The external recording medium 6, such as a memory card, is detachably installed in the digital camera.

The image sensor 2 is an imaging device of two-dimensional type, which includes various forms such as a CCD type one and a MOS type one. The subject light that has passed a photographic lens 1 forms an image on an imaging side of the image sensor 2. When the subject image is formed on the imaging side of the image sensor 2, a signal charge of each pixel is accumulated according to the intensity of the light of the subject image. In the image sensor 2, the storage time of charge accumulated in each pixel (shutter speed) is controlled by a shutter gate pulse from the control circuit 7. This is a function called an electronic shutter.

The signal charge accumulated in each pixel of image sensor 2 is read one by one as an image output signal, and converted into the digital signal with analog to digital converter 3. The video signal converted into a digital signal is once stored in the memory 4 as an image data. The image processing circuit 5 includes signal processing circuits such as a ?-correcting circuit, a brightness signal generating circuit, a color difference signal generation circuit, and a data compression/decompression circuit, etc. The image processing circuit 5 reads the image data from the memory 4, performs various signal processings, converts the processed data into an image data of a prescribed form (for instance, JPEG format), and stores the obtained image data in the memory 4 or the external recording medium 6.

The CPU 8 is connected with the control circuit 7, the spectroscopic instruments 9, the memory 4, etc., and the CPU 8 performs various calculations such as exposure amount and a state of focus according to a prescribed algorithm, and manages the control of AS (automatic exposure) and AF (automatic focus) and the control of the AWB (auto white balance) operation parts 10, etc., as a whole. In the AWB calculation part 10, the lighting condition is calculated based on a result of the measurement with the spectroscopic instrument 9, and R gain and B gain for the white balance adjustment according to the calculated lighting condition are set. The R gain and B gain for the white balance adjustment are stored beforehand in the CPU 8 according to the lighting condition (sunlight, white lamp, and fluorescent lamp, etc.).

Colored filters (for instance, R, G, and B filters) are formed in a prescribed array in each photoelectric device of the image sensor 2, and an R signal, a G signal, and a B signal are output from each photoelectric device. In the image processing circuit 5, the R signal and the B signal out of the signals of R, G, and B are multiplied by the R gain and the B gain, respectively, for the white balance adjustment mentioned above. As a result, imaging signals of an optimal white balance (R signal, G signal, and B signal) are obtained. Thereafter, the gamma correction processing is performed to the R signal, the G signal, and the B signal of which the white balance is adjusted. In addition, the R signal, the G signal, and the B signal to which the gamma correction is processed are converted into a brightness signal (Y signal) and color-difference signals (Cr and Cb signals).

Explanation of Spectroscopic Instrument 9

Figure 2:
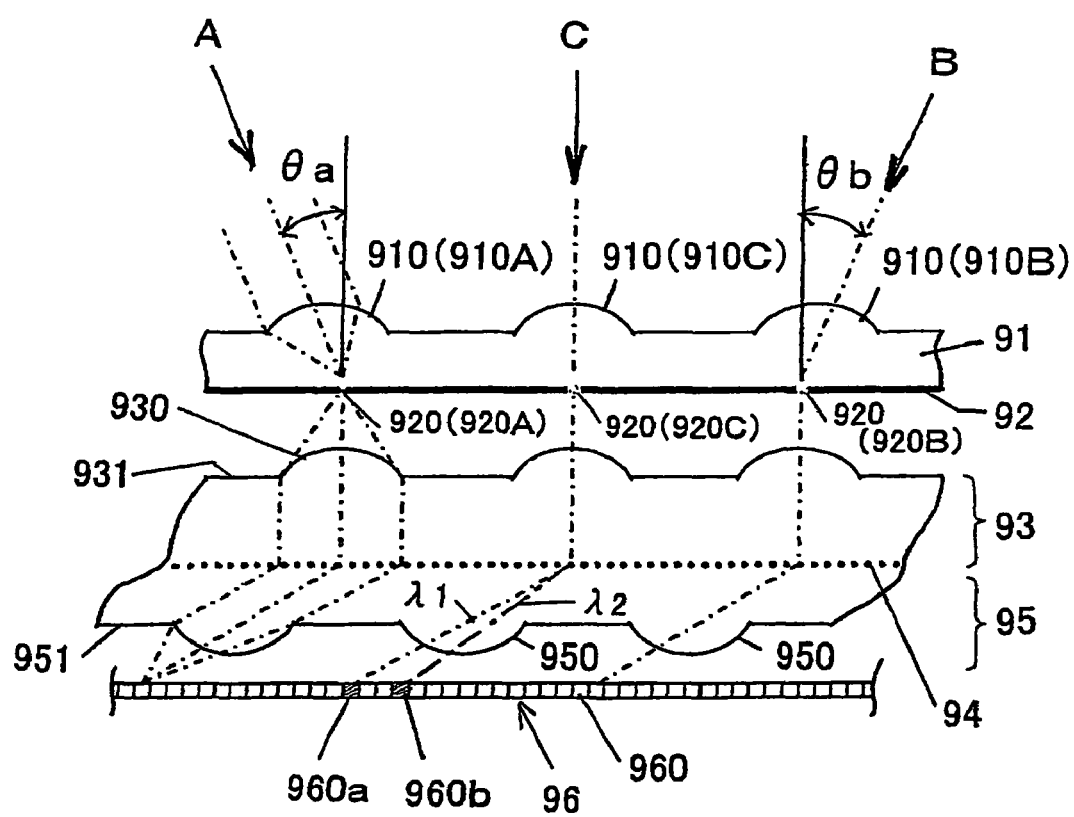
FIG. 2 is a figure where the skeleton framework of a spectroscopic instrument is shown.

FIG. 2 shows a schematic construction of the spectroscopic instrument 9. The spectroscopic instrument 9 is provided with a first lens array 91, an aperture 92, a second lens array 93, a diffraction grating 94, a third lens array 95, and a light receiving section 96 sequentially from an incident side of the observed light (from above in the figure). In the following, the structure and function of these are sequentially described starting from the first lens array 91.

Figure 3:
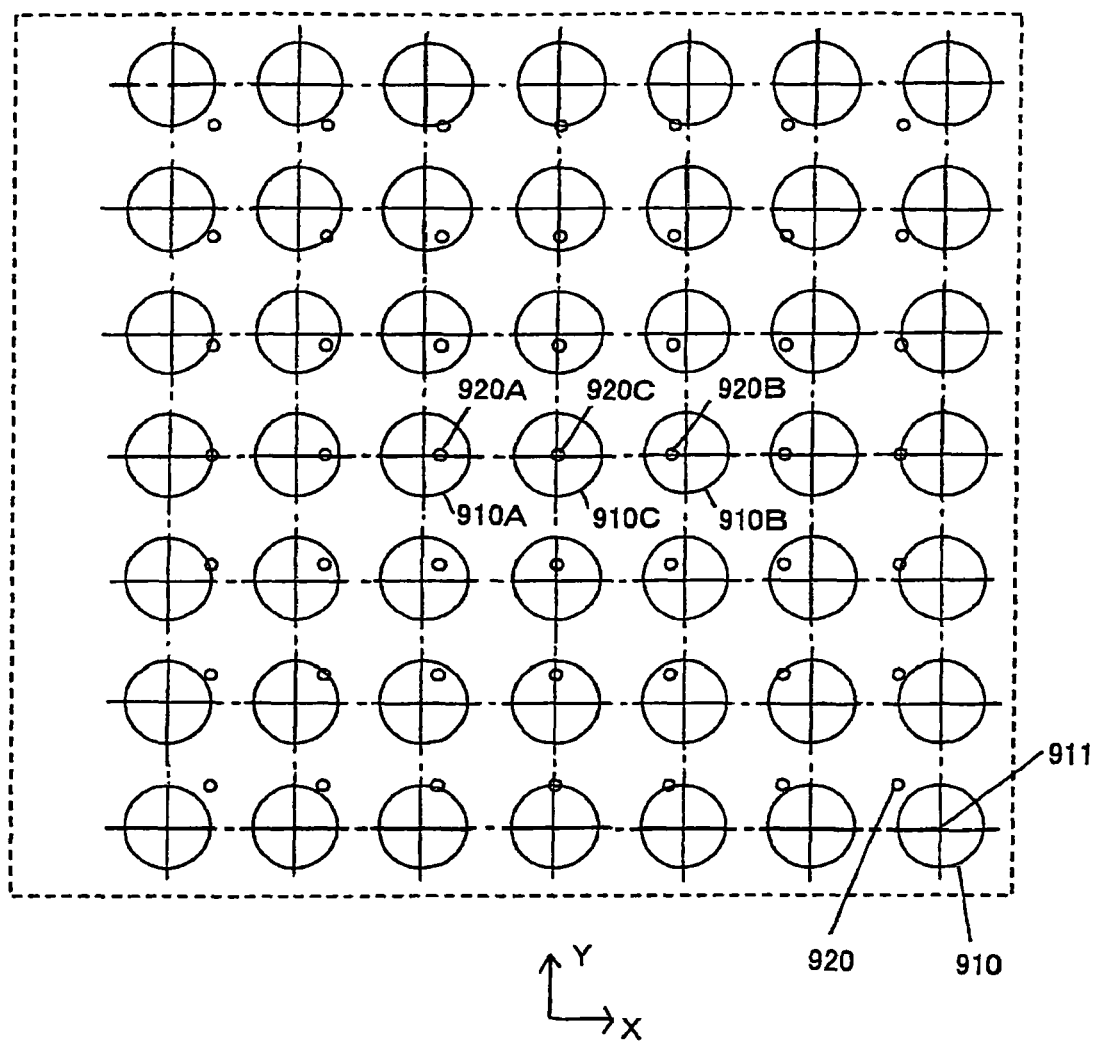
FIG. 3 is a figure illustrating arrangement of lenses and openings.

In the first lens array 91, there are formed a plurality of microlenses 910 in a two-dimensional array (see FIG. 3). A back side of the first lens array 91 is planar, and the aperture 92 is integrally formed on the back side of the first lens array 91. The aperture 92 includes a plurality of minute openings 920 formed in a shading member. Each opening 920 of the aperture 92 is disposed corresponding to the respective microlens 910 of the first lens array 91, and formed on a focal plane of the microlenses 910, respectively. Although not shown in FIG. 2, a spacer is disposed between the first lens array 91 with the aperture 92 and the second lens array 93 to keep a space therebetween at a predetermined extent.

FIG. 3 is a plan view showing the arrangement of the microlenses 910 and the openings 920, when the first lens array 91 with the aperture 92 formed is seen from the direction of the incidence of light. The microlenses 910 and the openings 920 are arranged like a lattice. Each opening 920 is disposed in a position in which it is deviated by a predetermined extent from an optical axis 911 of the corresponding microlens 910 in a predetermined direction on the focal plane of the microlens 910 except for the opening 920C corresponding to the microlens 910C formed at the center of the first lens array 91. In the example shown in FIG. 3, each opening 920 is deviated in the direction toward the center of the first lens array 91. The gap, referred to as "eccentricity amount" hereafter, is set greater when it is positioned farther from the center.

Figure 4:
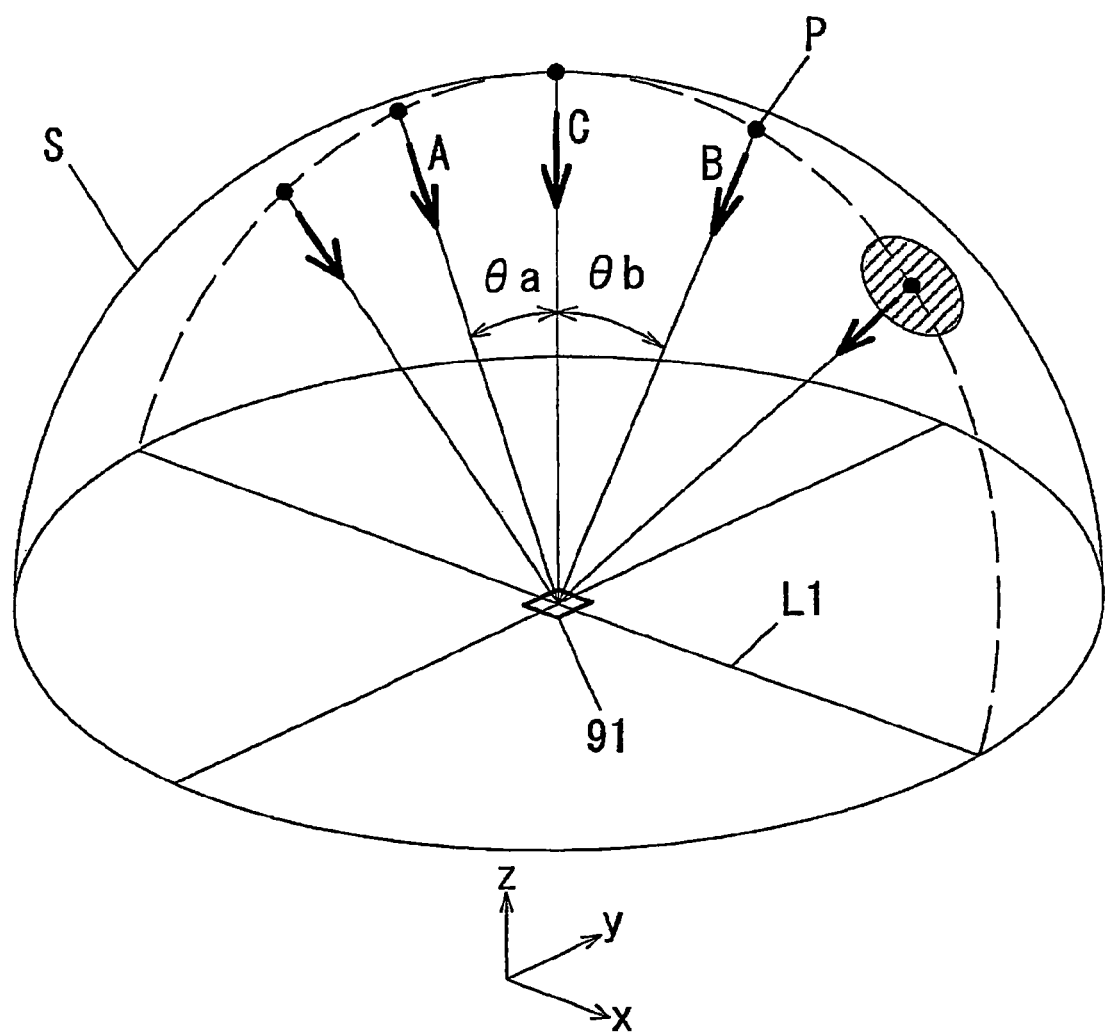
FIG. 4 illustrates the direction of the light flux, three-dimensionally.

Three microlenses 910 shown in FIG. 2 indicate the microlens 910C in the center of FIG. 4 and the microlenses 910A and 910D disposed right and left sides thereof. Similarly to the case of the opening 920C, the opening 920 corresponding to the microlenses 910A and 910B are referred to as 920A and 920C. Because open each mouth 920 of squeezing 92 is formed on the focal plane of microlens 910 as mentioned above, the light that enters into each microlens 910 of the first lens array 91 is imaged formation on the plane of squeezing 91.

The opening 920C of the center is disposed on an optical axis of the microlens 910C. Therefore, the light flux that enters into an optical axis of the microlens 910C in parallel as shown by arrow C forms an image on the opening 920C. Therefore, the light flux that forms an image on the opening 920C enters the lens in parallel to the optical axis of the microlens 910C as shown by arrow C. On the other hand, the opening 920A is disposed as deviated from an optical axis of the microlens 910A rightward. Therefore, the light flux on the opening 920A from the direction of A that is inclined leftward by θa relative to the optical axis forms an image. Oppositely, the opening 920B is disposed as deviated leftward from the optical axis of the microlens 910B. Therefore, the light flux from the direction of B that is inclined rightward by θb relative to the optical axis forms an image.

The amount of eccentricity of opening 920 is greater when the opening 920 is farther from the center as shown in FIG. 3. Therefore, when the opening 920 is farther from the center, the light flux from the direction that is more greatly inclined from the optical axis forms an image. FIG. 4 three-dimensionally indicates the directions of the light fluxes A, B, and C. The microlenses 910A, 910B, and 910 C in FIG. 3 are disposed along the straight line L1 on the first lens array 91. Points P show intersections of the light axes of the light fluxes A, B, and C with a hemisphere S. Points P are intersections between (the axes of the light fluxes A, B, and C and hemispheres S. In the example shown in FIG. 3, forty nine (49) openings 920 with different amounts of eccentricity and different directions of deviation are formed. Accordingly, 49 points P will be drawn on the hemisphere S of FIG. 4. That is, disposing the respective openings 920 so as to be deviated from the optical axes of the corresponding microlenses 910 enables the light fluxes with different angles of incidence to form respective images on separate openings 920.

Figure 5:
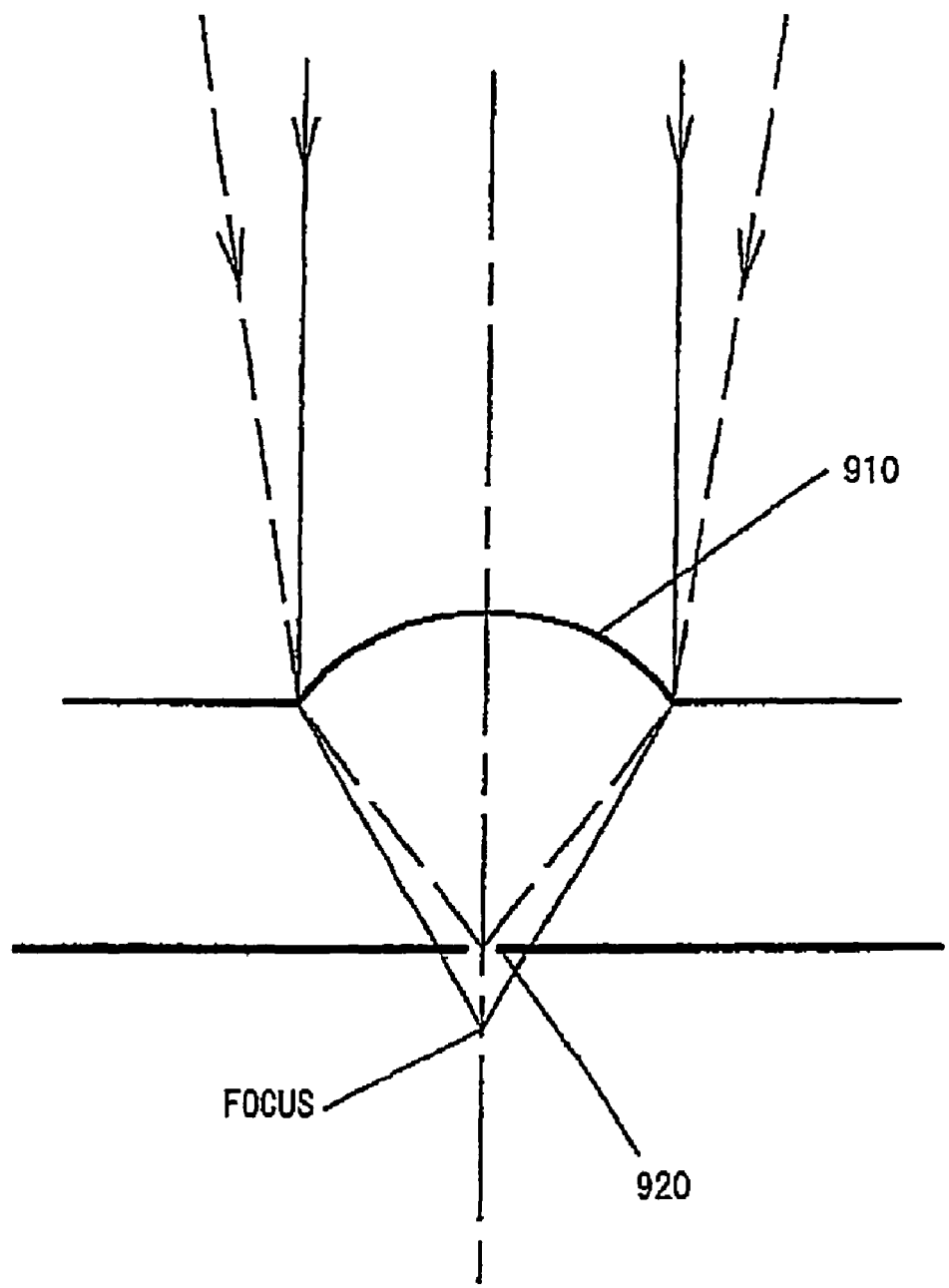
FIG. 5 is a figure illustrating the ray when the position of an opening is moved in front of the focal plane.

According to the present embodiment, the openings 920 are formed on the focal plane of the microlenses 910 as mentioned above. However, the openings 920 may be disposed at positions deviated from the focal plane of the microlenses 910 backward and forward to some extent. For example, as shown in FIG. 5, when the opening 920 is in a deviated position deviated on the front side (on the upper side in FIG. 5) of the focal plane, light from a predetermined region of solid angle indicated in broken line in the figure enters the opening 920. As a result, it is possible to capture the light flux from a region as indicated in hatched line in FIG. 4 by a single microlens 910, so that light fluxes from a broader region can be observed. The amount of deviation of the opening from the focal plane can be determined based on the relationship between the amount of eccentricity of the opening and the focal length of the microlens 910.

The second lens array 93, the diffraction grating 94, and the third lens array 95 are disposed under the aperture 92. That is, the back surfaces of the second lens array 93 and the third lens array 95 each having a planar surface are connected mutually with the diffraction grating 94 placed therebetween. A transmission grating is used as the diffraction grating 94.

Figure 6:
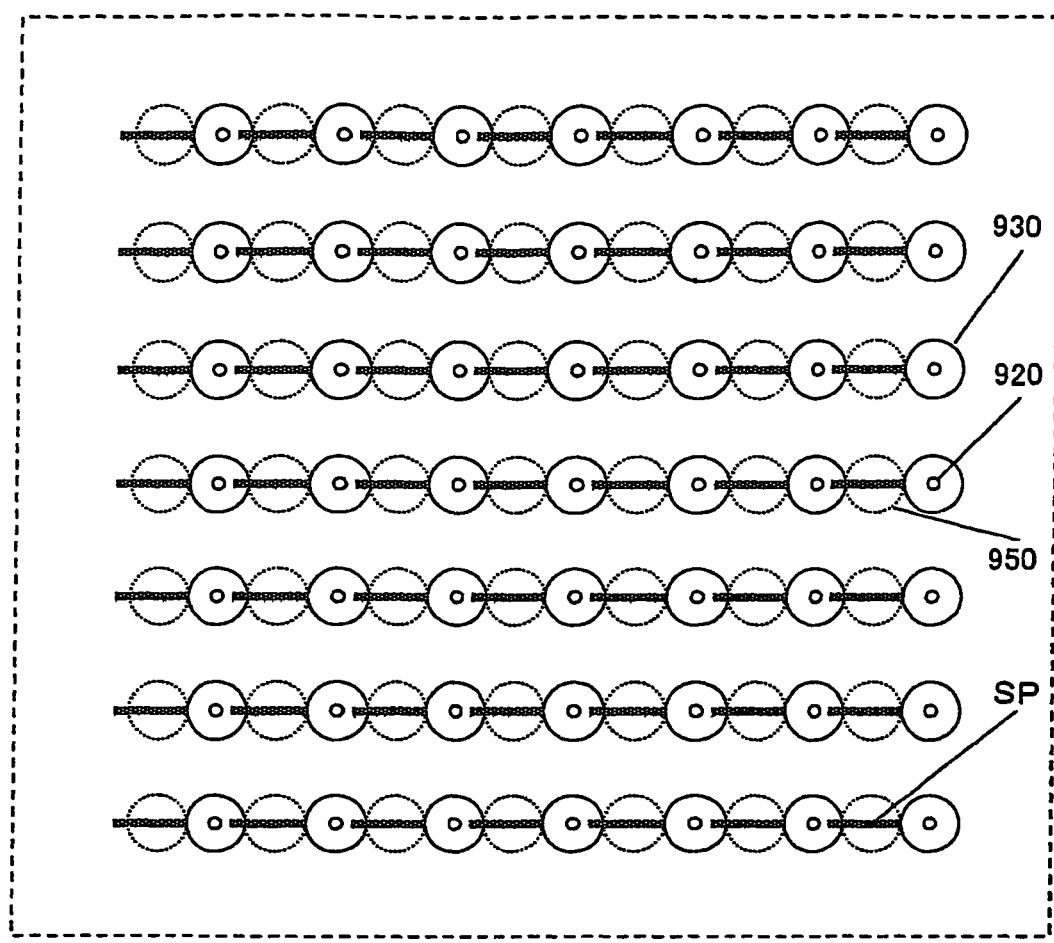
FIG. 6 is a figure where the arrangement of the opening and two kinds of lenses is shown.

FIG. 6 is a plan view illustrating the disposition of the opening 920, the microlens 930, and the microlens 950 in which the aperture 92, the second lens array 93, and the third lens array 95 are seen from the side of the first lens array 91. As shown in FIG. 2, respective microlenses 930 are disposed in the same array so as to correspond to the openings 920 to come in superposition in the vertical direction). An optical axis of each microlens 930) agrees with an optical axis of each corresponding opening 920. In addition, each opening 920 is disposed in the focus position of each corresponding microlens 930.

The light collimated to be a parallel pencil by microlens 930 enters into the diffraction grating 94, and is diffracted by the diffraction grating 94. The diffracted light is output under FIG. 2 at a diffraction angle corresponding to the wavelength of the light. Then, this output light enters into the microlens 950 of the third lens array 95. In this embodiment, the first diffraction ray is used for the measurement.

The light diffracted by the diffraction grating 94 forms an image on the light detecting element 960 of the light receiving part 96 by the microlenses 950. The light receiving surface of the light receiving part 96 is in an optically conjugate relation with the aperture 92 mentioned above. The image of the opening 920 will be formed on the light detecting element 960. To achieve such a position, a spacer (not shown) is disposed between the third lens array 95 and light receiving is part 96 in order to keep the interval therebetween at a specific value.

A heavy line SP in FIG. 6 shows a spectrum of the first diffraction ray projected on the light receiving part 96. Thus, the spectrum SP is projected on a plurality of light detecting elements 960. When the relation between the wavelength of light and the output of the light detecting element 960 is obtained, the spectrum curve of the light flux in the specific direction observed through one microlens 910 for one heavy line SP is obtained. Spectra of light from 49 directions are obtained since there are 49 microlenses 910 as mentioned above.

Figure 7:
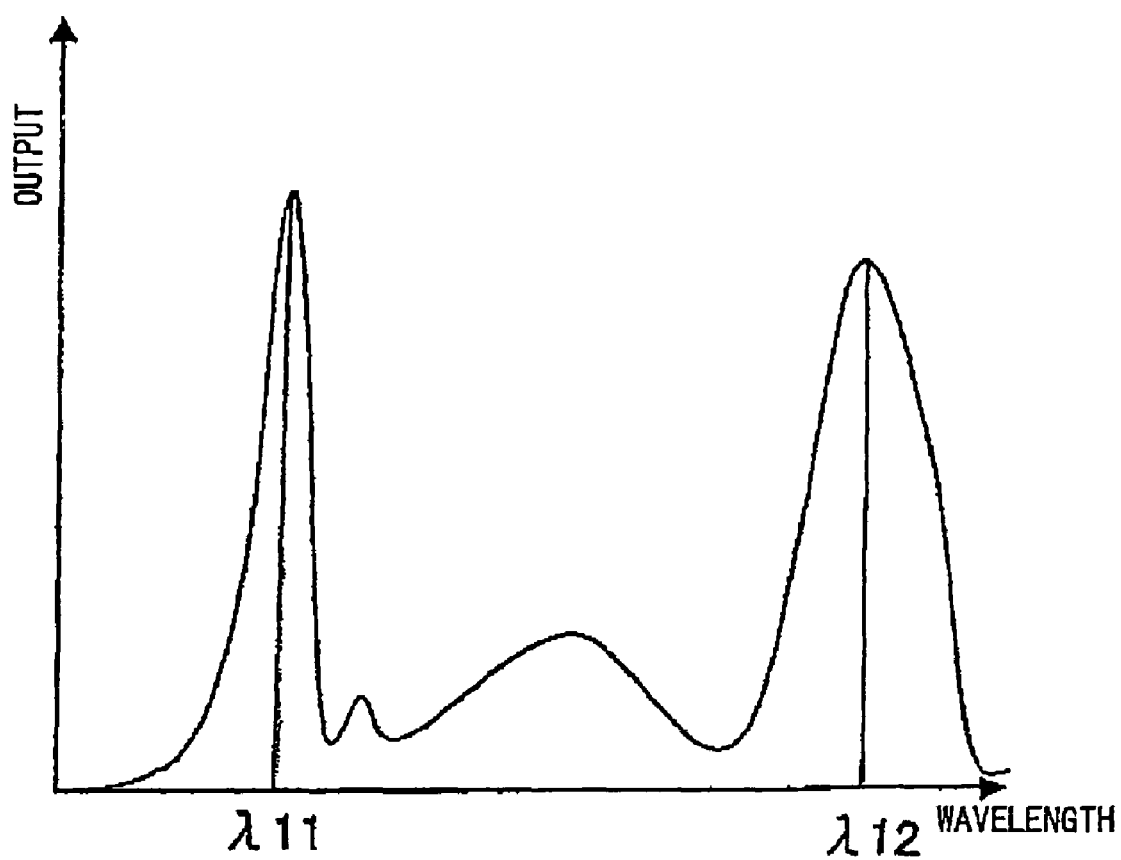
FIG. 7 is a graph showing one example of the spectrum curve.

Spectra of light from 49 directions are obtained since there are 49 microlenses 910 as mentioned above. FIG. 7 shows one example of the spectrum curve obtained from the spectra of those microlenses in whole. FIG. 7 shows two high peaks in the curve at a wavelength of ?11 and a wavelength of ?12. From this spectrum curve, it is possible to recognize what an optical source is present, that is, what the lighting condition is like.

Figure 8:
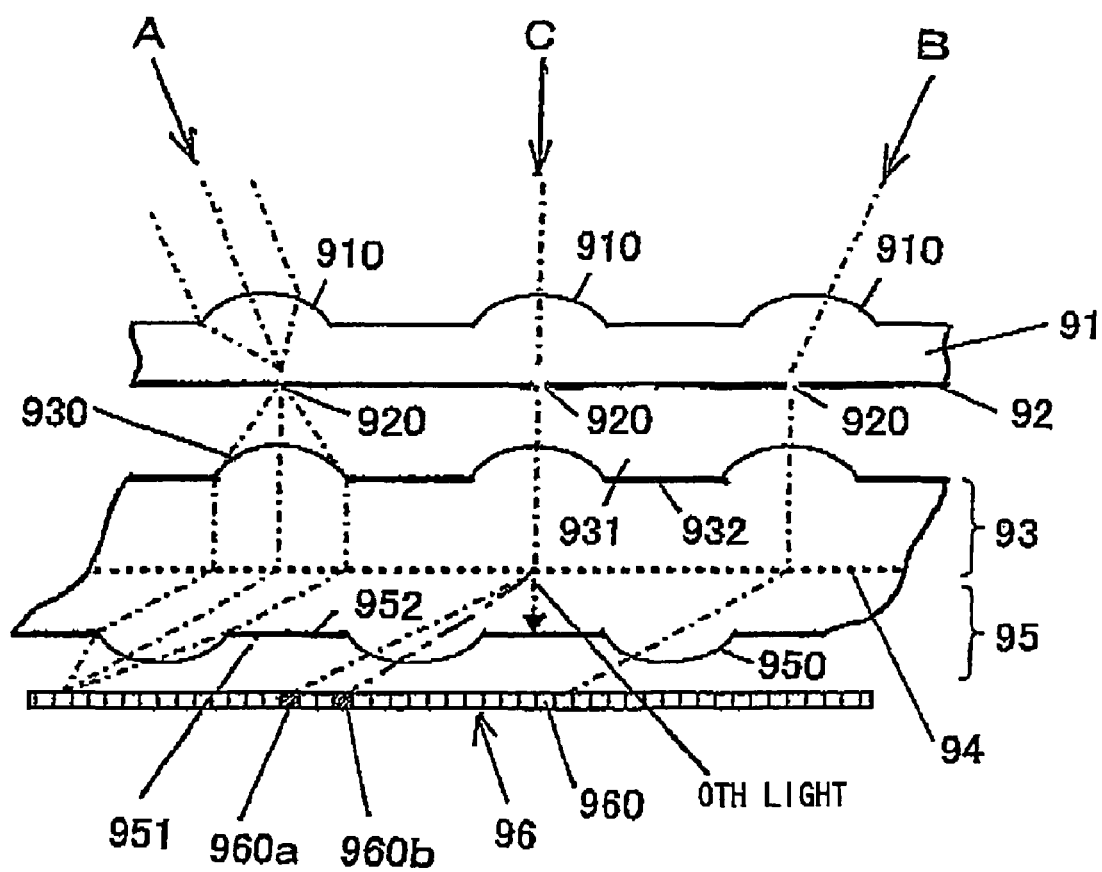
FIG. 8 is a figure showing a first modification of the spectroscopic instrument.

FIG. 8 shows a first modification of the spectroscopic instrument 9 mentioned above. In the spectroscopic instrument 9 shown in FIG. 2, a zeroth (0-th) light, which goes out as straight advancement from the diffraction grating 94, enters into the light receiving part 96 through a non-lens unit 951 of the third lens array 95. As a result, the output of the 0th light is included in the output of the light detecting element 960. This influences the spectroscopic measurement. Moreover, the light that enters into the non-lens unit 931 of the second lens array 93 also influences the spectroscopic measurement as unnecessary light.

Then, in the spectroscopic instrument shown in FIG. 8, light absorbing members 932 and 952 are disposed to the non-lens units 931 and 951. Black chrome, etc. are used for the photoabsorption members 932 and 952. The black chrome may be deposited to the surfaces of the non-lens units 931 and 951. By forming the photoabsorption members 932 and 952, the influence of unnecessary light can be decreased to improve the accuracy of spectroscopy. The 0th light can be prevented from entering into the microlens 950 by providing the photoabsorption members 932 and 95 and setting the diffraction angle so that the microlens 930 will not come in superposition above the microlens 930 as shown in FIG. 6.

Figure 9A:
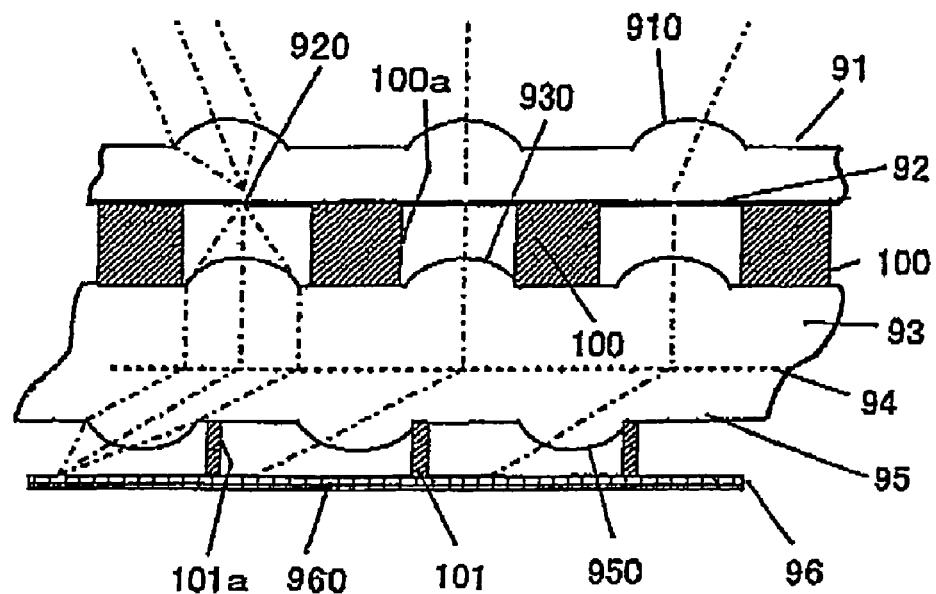
FIG. 9A is a figure showing a second modification of the spectroscopic instrument with a different type of partition disposed.
Figure 9B:
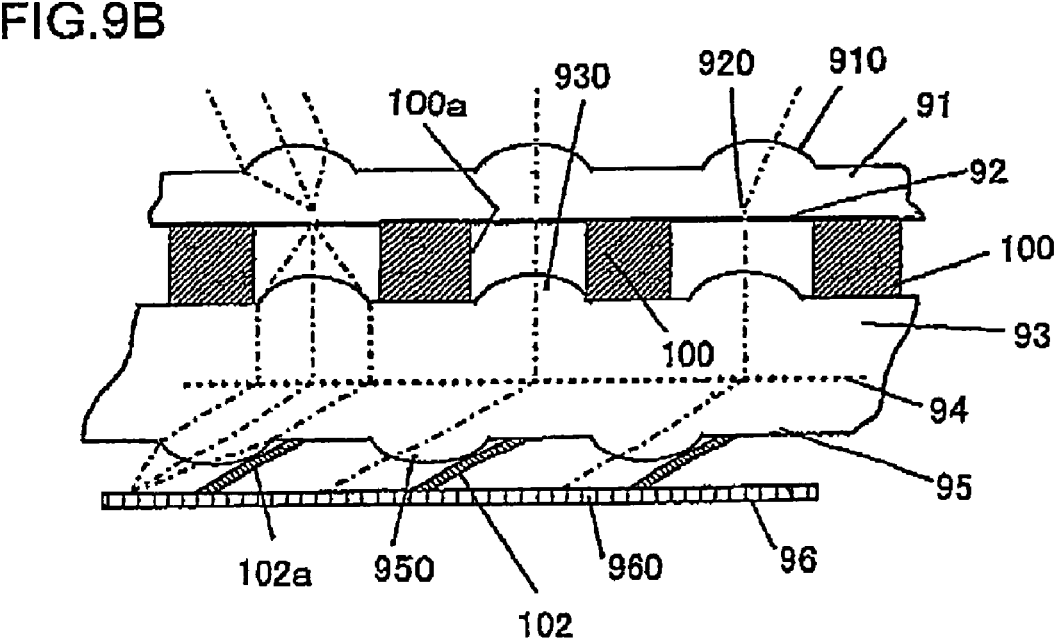
FIG. 9B is a figure showing a second modification of the spectroscopic instrument, with a still different type of partition disposed.

Moreover, FIGS. 9A and 9B show a second modification of the spectroscopic instrument 9. As mentioned above, in the spectroscopic instrument 9 shown in FIG. 2, a spacer is disposed that keeps the optical member with the first lens array 91 and the aperture 92 at predetermined intervals from the optical member with the second lens array 93, the diffraction grating 94, and the third lens array 95, so that the opening 920 is in the focus position of the microlens 930. Similarly, a spacer is provided, which keeps the optical member with the third lens array 95 at a predetermined distance from the light receiving part 96.

Then, in the spectroscopic instrument shown in FIG. 9A, partitions 100 and 101 are disposed instead of the above-mentioned spacers. The partitions 100 and 101 serve both as the spacer and as the member that prevents unnecessary light from entering. A cylinder space 100a, in which the opening 920 and the microlens 930 in a pair are enclosed, is formed in the partition 100 disposed between the aperture 92 and the second lens array 93, respectively. Therefore, only light from the opening 920 enters into the microlens 930 to prevent unnecessary light from entering. Moreover, for the partition 101 disposed between the third lens array 95 and the light receiving part 96, the cylinder space 101a is formed so as to enclose surroundings of microlens 950 and a plurality of light detecting elements into which light from the microlens 950 enters. On the other hand, for the spectroscopic instrument shown in FIG. 9B, a partition 102 is disposed instead of the partition 101 that has been mentioned above.

On the other hand, in the spectroscopic instrument shown in FIG. 9B, a partition 102 is disposed instead of the partition 101 that has been mentioned above. The shape of the cylinder space 102a of the partition 102 is different from that of the cylinder space 101a of FIG. 8A. Since the first diffraction ray goes out from the diffraction grating 94 obliquely toward bottom left, the cylinder space 102a is configured to be a cylindrical space that is obliquely inclined so that the direction of the axis of the cylinder space 102 agrees with the direction of the spectrum spectroscopy. This prevents the cylinder space 102a from disturbing a region in which the diffracted ray is projected.

A straight line lattice-type diffracting grating, for instance, whose grating space is decided from an angle required for a primary (or first order) diffraction ray, a usual shading-type or phase-type diffracting grating can be used as one example of the diffraction grating 94 of the transmission type mentioned above. In this case, a diffracting grating of the type that efficiently diffracts a diffraction ray of a necessary order, such as one of the Echelon type is preferred. As a result, the diffraction ray not used for the measurement can be prevented from entering into the light detecting element 960 to improve the spectrum accuracy.

Figure 10:
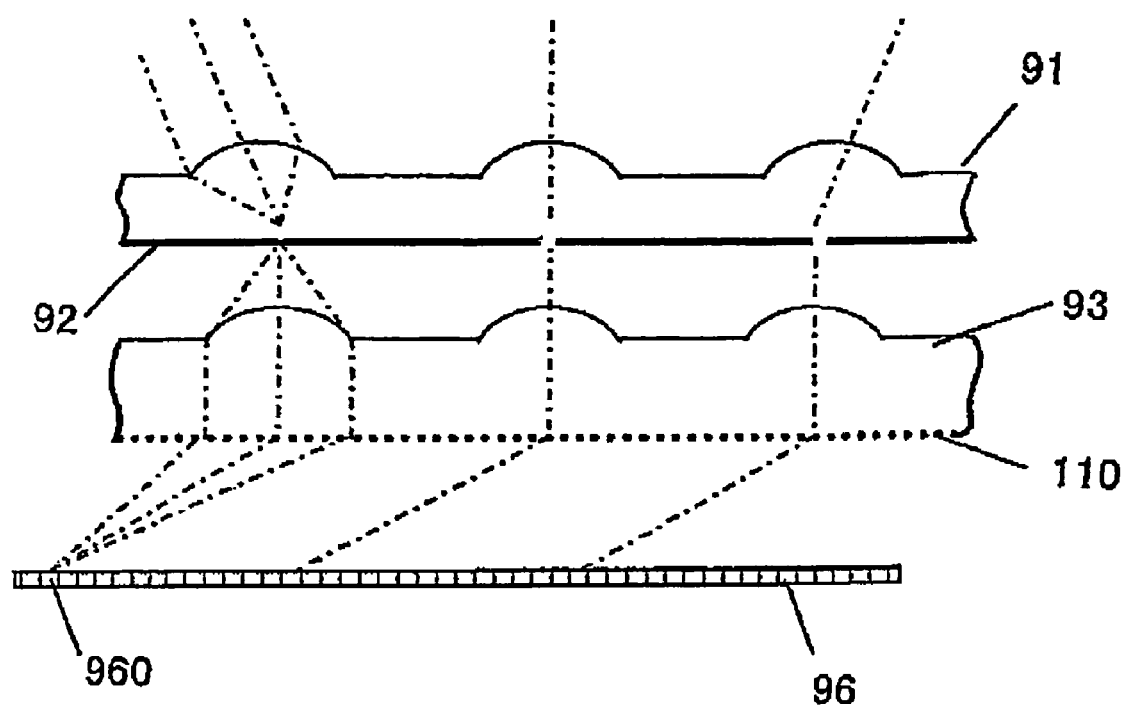
FIG. 10 is a figure showing a construction of the spectroscopic instrument when a hologram is used.

Moreover, the spectroscopy may be performed by using hologram of the phase-change type that has a certain thickness in place of a usual diffraction grating. Especially, the 0th light may be assumed to be theoretically 0 in the case of the hologram of the volume type, and unnecessary multi-order diffraction rays can be controlled. As a result, the utilization efficiency of light can be improved, and the is spectroscopy measurement becomes possible with darker light. In addition, when the hologram is used, the hologram may be adapted to have the functions of spectroscopy function and of the third lens array 95. FIG. 10 shows the construction of the spectroscopic instrument 9 when such hologram 110 is used. The diffraction ray forms an image on light detecting element 960 by hologram 110.

Figure 11:
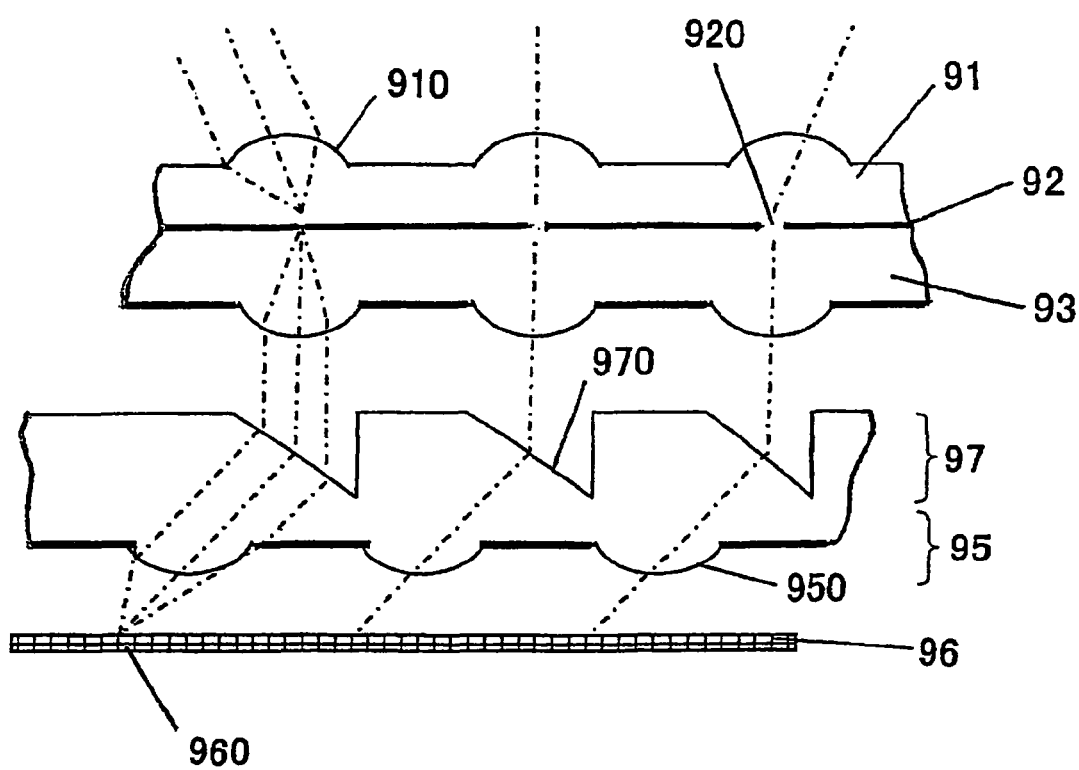
FIG. 11 is figure where the composition of spectroscopic instrument 9 when prism array 97 is used is shown.

Moreover, the prism array 97 instead of diffraction grating 94 may be used as shown in FIG. 11. A plurality of microprisms 970 formed in the prism array 97 is disposed on an optical axis of respective microlens 930 of the second lens array 93. In the construction that includes the prism array 97, the first lens array 91, the aperture 92, and the second lens array 93 are formed as an integrated optical member. Besides, the prism array 97 and the third lens array 95 are formed as an integrated optical member.

The optical member consisting of the first lens array 91, the aperture 92, and the second lens array 93 and the optical member consisting of the prism array 97 and the third lens array 95 are kept at a predetermined intervals with a spacer (not shown). Light from respective microlens 930 is distributed respectively by microprisms 970 according to the wavelength. The distributed light forms an image on the light detecting element 960 by the microlens 950 of the third lens array 95.

In the embodiment mentioned above, the opening 920 of the aperture 92 has been described as a circle. The shape of the opening 920 may be set so as to match the shape of the light detecting element 960 on which the image of the opening 920 is formed. The opening 920 of the aperture 92 may be, for instance, of a long rectangle in a direction vertical to the direction of the spectroscopy, (direction of right and left in the figure), i.e., the direction vertical to paper, or similarly, of an oval that is elongate in a vertical direction. For circular opening 920, the cylinder or toric lens instead of the spherical lens may be used as the microlens 950 of the third lens array 95 to lengthen the aperture image in the direction vertical to the direction of spectroscopy.

As mentioned above, in the spectroscopic instrument 9 according to this embodiment, light from various directions can be subjected to spectroscopic measurements separately and simultaneously. Then, the photographic image of which lighting conditions have been appropriately taken into consideration can be obtained by performing white balance processing by the AWB calculation part 10 using the results of spectrophotometric processing. Moreover, conventional CCD sensors and CMOS sensors etc. of the black and white photography can be used as the light receiving part 6, and a low-cost, small spectroscopic instrument can be provided. Therefore, the spectroscopic instrument according to the present invention can be easily installed in imaging devices that take still pictures and video pictures, such as cameras and video cameras, etc. as well as other optical measurement devices.

As long as the features and functions of the present invention are realized, the present invention is not limited to the above-mentioned embodiments.

The above-described embodiments are examples, and various modifications can be made without departing from the scope of the invention.

What is claimed is:
1. A spectroscopic instrument, comprising:
   a plurality of first lenses arranged one-dimensionally or two-dimensionally;
   a plurality of aperture openings each stationarily provided on or near a focal plane of a corresponding one of the plurality of first lenses;
   a spectroscopic unit that spectrally distributes light that has passed through each of the plurality of aperture openings; and a light receiving unit that receives the light from each of the plurality of aperture openings spectrally distributed by the spectroscopic unit, wherein the plurality of aperture openings are each disposed at a position that is deviated from an optical axis of the corresponding one of the plurality of first lenses in the focal plane or a plane parallel to the focal plane of the corresponding one of the plurality of first lenses.

2. A spectroscopic instrument according to claim 1, wherein an amount of deviation or a direction of deviation of the position at which each of the plurality of aperture openings is disposed from the optical axis of the corresponding one of the plurality of first lenses is different for each of the plurality of aperture openings.

3. A spectroscopic instrument according to claim 2, wherein the amount of deviation or the direction of deviation of the position at which each of the plurality of aperture openings is disposed from the optical axis of the corresponding one of the plurality of first lenses is greater for an aperture opening that is disposed closer to a periphery of an array of the plurality of aperture openings.

4. A spectroscopic instrument according to claim 2, wherein the amount of deviation or the direction of deviation of the position at which each of the plurality of aperture openings is disposed from the optical axis of the corresponding one of the plurality of first lenses is greater for an aperture opening that is disposed with a greater amount of deviation or a greater angle of direction of deviation of a position of the aperture opening from a central axis of an optical system that includes the plurality of first lenses, the plurality of aperture openings, the spectroscopic unit, and the light receiving unit.

5. A spectroscopic instrument according to claim 1, wherein the light receiving unit includes a plurality of light receiving elements, and the spectroscopic unit inputs the light that has passed through each of the plurality of aperture openings into different light receiving elements out of the plurality of the light receiving elements depending on wavelength thereof.

6. A spectroscopic instrument according to claim 5, further comprising:

a member that is disposed between the spectroscopic unit and the light receiving unit to keep the spectroscopic unit and the light receiving unit at a predetermined distance and prevent unnecessary light from entering into the light receiving elements.

7. A spectroscopic instrument according to claim 1, wherein the light receiving unit includes a plurality of light receiving elements, and the spectroscopic unit includes:

a plurality of second lenses disposed corresponding to the plurality of aperture openings, respectively, to collimate the light that has passed through each of the plurality of aperture openings; and a diffracting optical element that diffracts the light from each of the plurality of second lenses depending on wavelength thereof and input the diffracted light from each of the plurality of second lenses into different light receiving elements depending on the wavelength thereof.

8. A spectroscopic instrument according to claim 7, further comprising:

a light shielding unit that prevents a zeroth (0th) diffracted light out of the diffracted light diffracted by the diffracting optical element from entering the light receiving unit.

9. A spectroscopic instrument according to claim 8, wherein the light shielding unit comprises a plurality of third lenses disposed deviated from respective optical axes of the plurality of second lenses to prevent the zeroth (0th) diffracted light from entering the light receiving unit.

10. A spectroscopic instrument according to claim 1, wherein the light receiving unit includes a plurality of light receiving elements, and the spectroscopic unit includes:

a plurality of second lenses disposed corresponding to the plurality of aperture openings, respectively, to collimate the light that has passed through each of the plurality of aperture openings; and a spectral prism that spectrally distributes the light from each of the plurality of second lenses depending on wavelength thereof and inputs the spectrally distributed light from each of the plurality of second lenses into different light receiving elements depending on the wavelength thereof.

11. A spectroscopic instrument according to claim 10, wherein the spectral prism comprises an array of a plurality of spectral prisms disposed corresponding to the plurality of second lenses, respectively.

12. An image producing device comprising:

a spectroscopic instrument according to claim 1;

an imaging unit that captures an image formed by an imaging optical system; and an image processing unit that acquires a lighting condition from a result of spectroscopy by the spectroscopic instrument and performs color conversion processing depending on the lighting condition on an image captured by the imaging unit.

13. A spectroscopic method, comprising:

restricting light incident through a plurality of first lenses arranged in a one-dimensional or two-dimensional array via a plurality of aperture openings arranged on or in a vicinity of a focal plane of each corresponding one of the plurality of first lenses; and spectrally distributing the light that has passed through each of the plurality of aperture openings, wherein the plurality of aperture openings are each disposed at a position that is deviated from an optical axis of the corresponding one of the plurality of first lenses in the focal plane or a plane parallel to the focal plane of the corresponding one of the plurality of first lenses.

14. A spectroscopic method according to claim 13, wherein an amount of deviation or a direction of deviation of the position at which each of the plurality of aperture openings is disposed from the optical axis of the corresponding one of the plurality of first lenses is different for each of the plurality of aperture openings.

15. A spectroscopic method according to claim 14, wherein the amount of deviation or the direction of deviation of the position at which each of the plurality of aperture openings is disposed from the optical axis of the corresponding one of the plurality of first lenses is greater for an aperture opening that is disposed closer to a periphery of an array of the plurality of aperture openings.

16. A spectroscopic method according to claim 14, wherein the amount of deviation or the direction of deviation of the position at which each of the plurality of aperture openings is disposed from the optical axis of the corresponding one of the plurality of first lenses is greater for an aperture opening that is disposed with a greater amount of deviation or a greater angle of direction of deviation of a position of the aperture opening from a central axis of an optical system that includes the plurality of first lenses, the plurality of aperture openings, a spectroscopic unit that performs the distributing step, and a light receiving unit that receives the light that has passed through the spectroscopic unit.

17. An image producing method, comprising:

capturing an image formed in an image formation system;

spectrally distributing light by restricting the light incident through each of a plurality of first lenses arranged in a one-dimensional or two-dimensional array via a plurality of aperture openings arranged on or in a vicinity of a focal plane of a corresponding one of the plurality of first lenses, spectrally distributing the light that has passed through each of the plurality of aperture openings, wherein the plurality of aperture openings are each disposed at a position that is deviated from an optical axis of the corresponding one of the plurality of first lenses in the focal plane or a plane parallel to the focal plane of the corresponding one of the plurality of first lenses, obtaining a lighting condition from a result of the spectral distributing of light; and performing color conversion processing depending on the lighting condition on the captured image.

18. An image producing method according to claim 17, wherein an amount of deviation or a direction of deviation of the position at which each of the plurality of aperture openings is disposed from the optical axis of the corresponding one of the plurality of first lenses is different for each of the plurality of aperture openings.

19. An image producing method according to claim 18, wherein the amount of deviation or the direction of deviation of the position at which each of the plurality of aperture openings is disposed from the optical axis of the corresponding one of the plurality of first lenses is greater for an aperture opening that is disposed closer to a periphery of an array of the plurality of aperture openings.

* * * * *